US012632472B2

(12) United States Patent
Gardner et al.

(10) Patent No.: US 12,632,472 B2
(45) Date of Patent: May 19, 2026

(54) SORTING DATA SETS AND DISCRIMINATING NON-DIFFERENTIATED DATABASE ENTRIES

(71) Applicant: Truist Bank, Charlotte, NC (US)

(72) Inventors: Kathy McLaughlin Gardner, Greensboro, NC (US); Ganesh Kumar Thandavarayan, Apex, NC (US)

(73) Assignee: TRUIST BANK, Charlotte, NC (US)

( * ) Notice: Subject to any disclaimer, the term of this patent is extended or adjusted under 35 U.S.C. 154(b) by 0 days.

(21) Appl. No.: 18/828,209

(22) Filed: Sep. 9, 2024

(65) Prior Publication Data

US 2026/0072946 A1 Mar. 12, 2026

(51) Int. Cl.
 *G06F 17/00* (2019.01)
 *G06F 7/08* (2006.01)
 *G06F 16/28* (2019.01)

(52) U.S. Cl.
 CPC .............. *G06F 16/285* (2019.01); *G06F 7/08* (2013.01)

(58) Field of Classification Search
 CPC ................................. G06F 16/285; G06F 7/08
 See application file for complete search history.

(56) References Cited

U.S. PATENT DOCUMENTS

| | | | | |
|---|---|---|---|---|
| 9,712,576 | B1 * | 7/2017 | Gill .......................... | G06N 5/04 |
| 11,782,954 | B2 * | 10/2023 | Tirupati .............. | G06F 16/2379 |
| | | | | 718/104 |
| 12,332,866 | B1 * | 6/2025 | Agrawal ............... | G06F 16/258 |
| 2011/0055207 | A1 * | 3/2011 | Schorzman ........... | G06F 16/951 |
| | | | | 707/723 |
| 2021/0081169 | A1 * | 3/2021 | Verma ................... | G06F 16/221 |
| 2021/0224297 | A1 * | 7/2021 | Sengupta .............. | G06F 16/285 |

OTHER PUBLICATIONS

Sandra Garcia Esparza et al., CatStream: categorising tweets for user profiling and stream filtering. In Proceedings of the 2013 international conference on Intelligent user interfaces. Association for Computing Machinery, 25-36. <https://doi.org/10.1145/2449396.2449402>, March (Year: 2013).*

* cited by examiner

*Primary Examiner* — Greta L Robinson
(74) *Attorney, Agent, or Firm* — Michael A. Springs, Esq.; Shumaker, Loop & Kendrick, LLP; Patrick B. Horne

(57) ABSTRACT

An initial data object associated with an initial user group is sorted by separation into multiple target data sets each associated with a respective target user group. The initial data object is sorted into multiple initial user profiles and evaluated to indicate each user of the initial user group as either differentiated as a unique user or non-differentiated as a unique user. The multiple target data sets are generated by adding, to each specific target data set of the multiple target data sets, a user-specific profile for each specific user of the target user group associated with the specific target data set, the user-specific profile including at least a portion of the initial user profile of the specific user. An alert signal is automatically transmitted to one or more agent device upon discriminating one or more user of the initial user group is indicated as non-differentiated as a unique user.

13 Claims, 4 Drawing Sheets

SORTING DATA SETS AND DISCRIMINATING NON-DIFFERENTIATED DATABASE ENTRIES

TECHNICAL FIELD

The present disclosure relates generally to automated data set mergers, and more particularly to combining data sets of multiple user groups while identifying any common users among the groups.

BACKGROUND

User groups representing companies and/or departments thereof are subject to transitions such as splits, demergers, acquisitions, and growth. Information and account continuity is of utmost importance for work efficiency and continuing business success. Expediency and efficacy are needing in transitioning group configurations, with regard to accounts, software, social media, digital content by which services providers conduct business, user contact information, and other stored content. A service provider having previous engagement with a pre-transition entity is better positioned to maintain a service relationship with one or post-transition entity by providing tools and streamlined approaches to assisting all parties through transitions, thereby benefiting existing engagements and encouraging further engagement.

Improvements are needed for automating data set sorting and generating multiple target data sets efficiently and effectively.

SUMMARY

This summary is provided to briefly introduce concepts that are further described in the following detailed descriptions. This summary is not intended to identify key features or essential features of the claimed subject matter, nor is it to be construed as limiting the scope of the claimed subject matter.

According to at least one embodiment each, a system and a method are provided for sorting an initial data object associated with an initial user group by separation into multiple target data sets, each target data set of the multiple target data sets being associated with a respective target user group of multiple target user groups, each target user group including a subset of users of the initial user group. The system includes: a computing system including one or more processor configured to execute computer-readable instructions, at least one of a memory device and a non-transitory storage device, and a communication interface for operatively connecting, via a communication network, the one or more processor to one or more agent device. Upon execution of the computer-readable instructions, the computing system performs steps including: automatically sorting data content of the initial data object into multiple initial user profiles, each initial user profile of the multiple initial user profiles associated with a respective user of the initial user group; automatically evaluating the data content of the initial data object to indicate each user of the initial user group as either differentiated as a unique user or non-differentiated as a unique user; automatically generating the multiple target data sets by adding, to each specific target data set of the multiple target data sets, a user-specific profile for each specific user of the target user group associated with the specific target data set, the user-specific profile including at least a portion of the initial user profile of the specific user; and automatically transmitting an alert signal to the one or more agent device upon discriminating one or more user of the initial user group is indicated as non-differentiated as a unique user.

In some embodiments, the system further automatically transmits a notification signal to the one or more agent device upon completion of generating the multiple target data sets.

Automatically generating the multiple target data sets may include adding, to each user-specific profile of each specific user of each target user group at least one of an application, a file, digital information, and a link register.

The at least one of an application, a file, digital information, and a link register may be added to the user-specific profile according to an initial user profile in the initial data object corresponding to the specific user.

For each user of the initial user group indicated as non-differentiated as a unique user, the system may further determine a unique identity by, at least one of: transmitting a confirmation request to a user device associated the non-differentiated user via at least one contact channel defined by the initial data object; comparing at least two of first name, last name, and email address stored in the initial data object; and transmitting a confirmation request to a user device associated with an authorized administrator via at least one contact channel defined by the initial data object.

The computing system may further automatically read a driver table to determine whether each user of the initial user group is in at least one target user group of the multiple target user groups.

The computing system may further confirm for each user of the initial user group being in a target user group, that at least one application of the user according to the initial data object is established for the user according to the target data set.

In at least one embodiment, to which the above examples and options apply as well, a system is provided for sorting an initial data object associated with an initial user group by separation into at least a first target data set and a second target data set, the first target data set being associated with a first target user group including a first subset of users of the initial user group, the second target data set being associated with a second target user group including a second subset of users of the initial user group. The system includes: a computing system including one or more processor configured to execute computer-readable instructions, at least one of a memory device and a non-transitory storage device, and a communication interface for operatively connecting, via a communication network, the one or more processor to one or more agent device. Upon execution of the computer-readable instructions, the computing system performs steps including: automatically sorting data content of the initial data object into multiple initial user profiles, each initial user profile of the multiple initial user profiles associated with a respective user of the initial user group; automatically evaluating the data content of the initial data object to indicate each user of the initial user group as either differentiated as a unique user or non-differentiated as a unique user; automatically generating the first target data set by adding a user-specific profile for each user of the first subset, the user-specific profile based at least in part on the initial user profile for the user; automatically generating the second target data set by adding a user-specific profile for each user of the second subset, the user-specific profile based at least in part on the initial user profile for the user; and automatically transmitting an alert signal to the one or more agent device upon discriminating one or more user of the initial user group is indicated as non-differentiated as a unique user.

The system may further include automatically transmitting a notification signal to the one or more agent device upon completion of generating at least one of the first target data set and second target data set.

Automatically generating the first target data set by adding a user-specific profile for each specific user of the first subset may include adding at least one of an application, a file, digital information, and a link register to the user-specific profile.

The at least one of an application, a file, digital information, and a link register may be added to the user-specific profile according to an initial user profile in the initial data object corresponding to the specific user.

The computing system may further automatically read a driver table to determine whether each user of the initial user group is in at least one of the first target user group and the second target user group.

The computing system may further confirm for each user of the initial user group being in the first target user group that at least one application of the user according to the initial data object is established for the user according to the first target data set.

The computing system may further confirm for each user of the initial user group being in the second target user group that at least one application of the user according to the initial data object is established for the user according to the second target data set.

The above summary is to be understood as cumulative and inclusive. The above-described embodiments and features are combined in various combinations in whole or in part in one or more other embodiments.

BRIEF DESCRIPTION OF THE FIGURES

The previous summary and the following detailed descriptions are to be read in view of the drawings, which illustrate some, but not all, embodiments and features as briefly described below. The summary and detailed descriptions, however, are not limited to only those embodiments and features explicitly illustrated.

DETAILED DESCRIPTIONS

Figure 1:
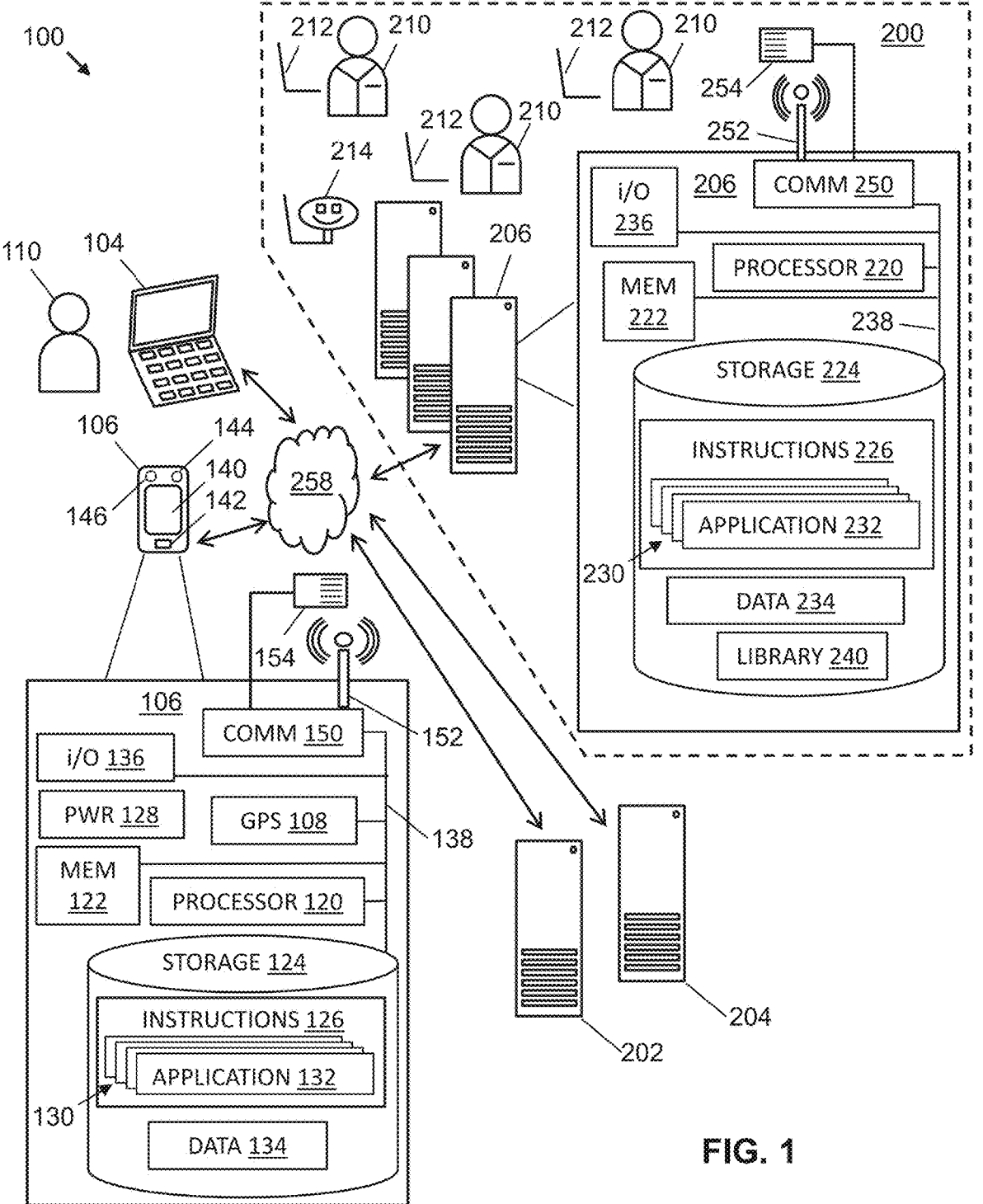
FIG. 1 illustrates a system for at least for sorting an initial data object and generating multiple target data sets therefrom at least in part, and an environment thereof, in accordance with various embodiments.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although steps may be expressly described or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Like reference numbers used throughout the drawings depict like or similar elements. Unless described or implied as exclusive alternatives, features throughout the drawings and descriptions should be taken as cumulative, such that features expressly associated with some particular embodiments can be combined with other embodiments.

Unless defined otherwise, technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to illustrations and/or block diagrams of systems and apparatuses (the term "apparatus" includes systems and computer program products), will be understood such that each function described or implied with reference to the illustrations and/or block diagrams, can be implemented by computer program instructions. These computer program instructions may be provided to a processor of a general-purpose computer, special-purpose computer, or other programmable data processing apparatus to produce a particular machine, such that the instructions, which execute via the processor of the computer or other programmable data processing apparatus, create mechanisms for implementing the functions/acts described, illustrated, and/or implied.

These computer program instructions may also be stored in a computer-readable memory that can direct a computer or other programmable data processing apparatus to function in a particular manner, such that the instructions stored in the computer readable memory produce an article of manufacture including instructions, which implement the function/act described, illustrated, and/or implied.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts described, illustrated, and/or implied. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The environment may include, for example, a distributed cloud computing environment (private cloud, public cloud, community cloud, and/or hybrid cloud), an on-premise environment, fog computing environment, and/or an edge computing environment. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random-access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications, including computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning system device (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met. Virtual agents 214 may assist, be assisted by, and/or be controlled by or associated with human agents. Being automated in whole or in part and implemented as or by computing devices, virtual agents 214 can be characterized as agent devices 212 in some embodiments.

A computing system 206 of the enterprise system 200 may include components such as, at least one of each of a processing device 220, and a memory device 222 for processing use, such as random-access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing system 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1. Users 110 may utilize one or more user device, referring to either or both of the computing device 104 and the mobile device 106, each including or defining a user GUI, to conduct browsing or access of, for example, content stored and disseminated via library 240.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN)

or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment of FIG. 1. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third and fourth party systems such as merchant systems configured to interact with the user device

106 during transactions and also configured to interact with the enterprise system 200 in back-end transactions clearing processes.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

Figure 2:
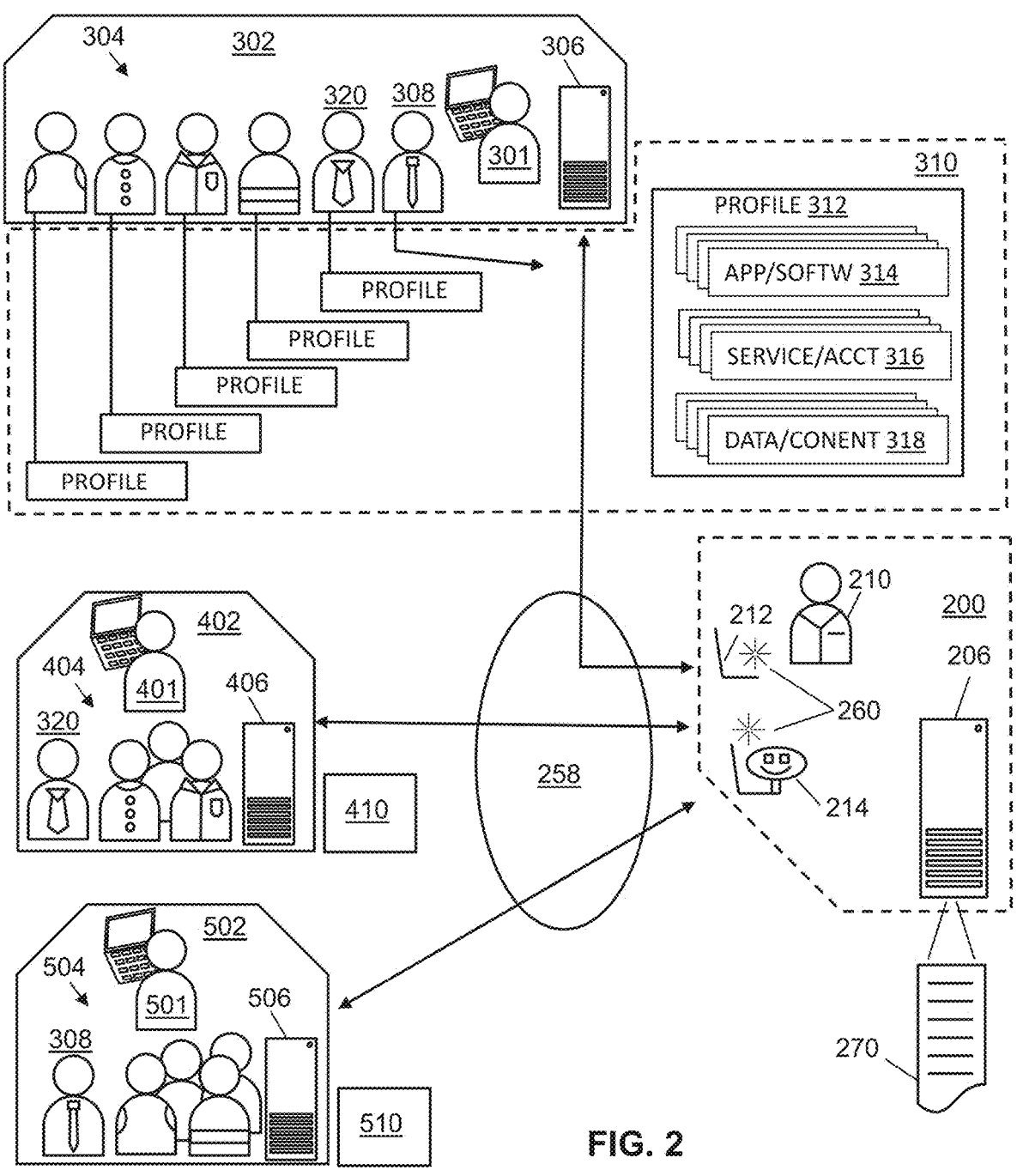
FIG. 2 shows the system of FIG. 1, in abbreviated illustration, sorting a data object in accordance with at least one embodiment in which an initial entity transitions at least in part into two post-transition entities, with a portion of an initial data object shown as pre-transition user profiles.
Figure 3:
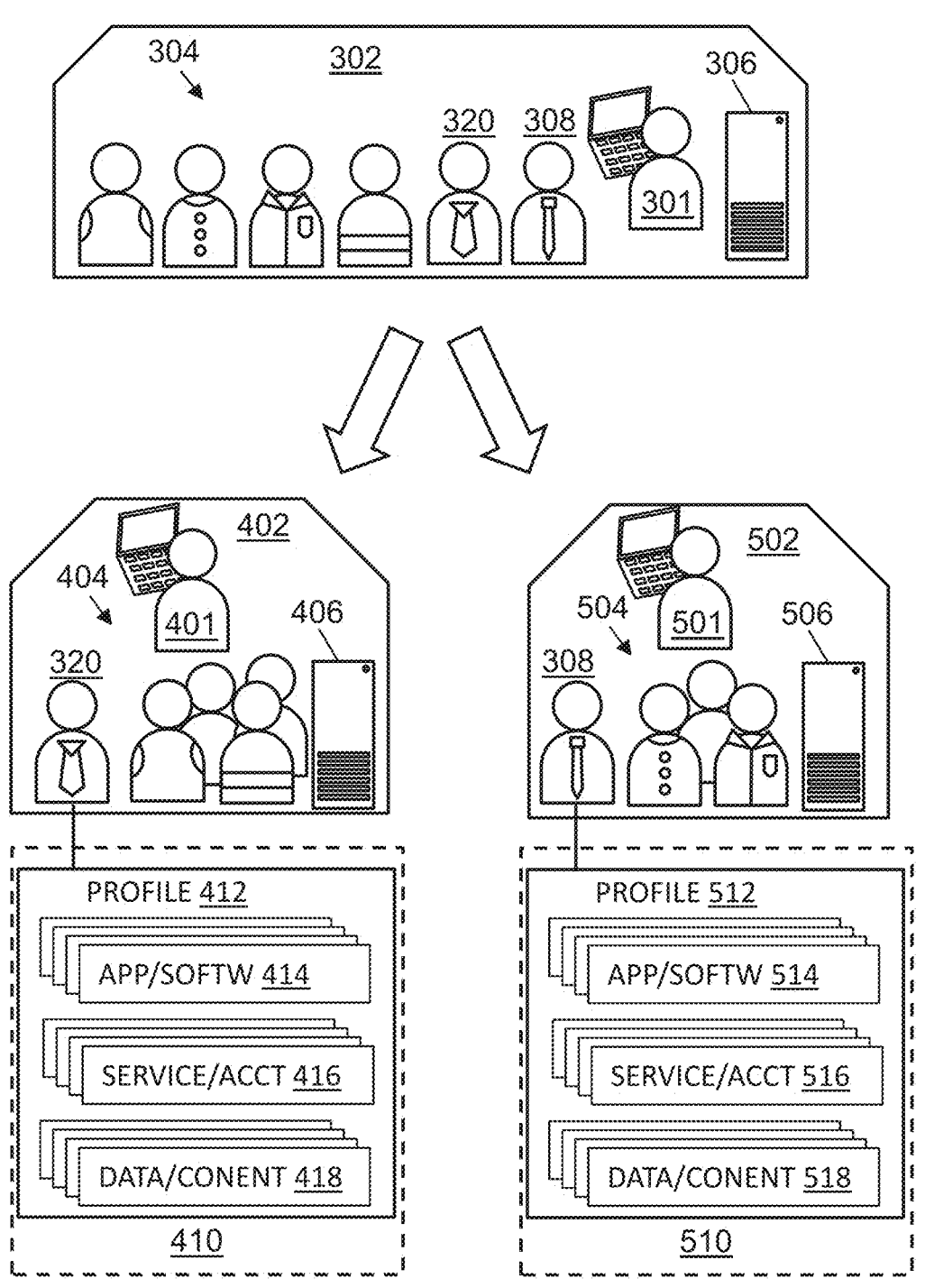
FIG. 3 shows the pre-transition and post-transition entities of FIG. 2 and portions of generated post-transition data sets as user profiles, in accordance with at least one embodiment.

According to some embodiments of the above-described devices and systems, as further exemplified in FIGS. 2-3, in some embodiments, a system and associated method for sorting an initial data object are provided. The initial data object, which is associated with an initial user group, is separated into multiple target data sets, each target data set of the multiple target data sets being associated with a respective target user group of multiple target user groups. Each target user group is or includes a subset of users of the initial user group.

In such embodiments, a sorting of user groups and their corresponding data and applications can represent, in non-limiting examples, demerger, a divestiture, and a statutory conversion. A company may for example be separated such that one or more spin-off company results. A company with multiple users, applications and accounts can break those out into multiple companies. The initial and target user groups can represent work units representing businesses or divisions thereof. These descriptions relate to examples in which a company or entity or any portion thereof transitions such that their employees, work groups, or other functional units are to be separated in part, restructured, expanded, or reduced. In some examples, a work group or business, at instances termed an initial user group herein, survives or continues through a transition, with some of the users of the initial user group splitting away to form a new smaller company or company division. In some examples, a user group is dissolved. Any number of initial users in an initial user group may enter a transitional phase or process and any number of resulting target user groups may continue. Through a transition such as a demerger, in some cases some employees or a company involved are maintained and others are reduced. Thus, in some cases a subset or users of a pre-transition user group, representing employees of a pre-transition company, continue as users of a target user group, representing employees of resulting post-transition companies.

In the example illustrated in FIG. 2, an initial user group 304 is transitioning from a single, combined, or merged organization or work unit into at least two delineated groups, referenced as a first target user group 404 and a second target user group 504. The below descriptions relate to a non-limiting example in which two companies are formed transitioning by demerger from a single company. These descriptions relate to other examples as well, for example non-limiting examples in which the referenced elements 402 and 502 are newly formed or otherwise transitioning departments or divisions of a parent company.

The initial or pre-transition company 302 is illustrated as having an initial or pre-transition user group 304 representing employees or other interested and authorized parties. The pre-transition company 302 is illustrated as having a computing system 306 in communication with the system 200 via the network 258. For the pre-transition company 302, a pre-transition data object 310 is maintained, for example at and/or by the computing system 306. In an example in which the company 302 has pre-transition engagement with the host or first entity system 200, the pre-transition data object 310 may be maintained in whole or in part at and/or by the computing system 206. The pre-transition data object 310 can be part of or structured as a pre-transition database and/or a pre-transition data set, containing, organizing, or referring to profiles, accounts, applications, contact lists, and other pre-transition content of the pre-transition company 302 and its user group 304.

The first post-transition company 402 is illustrated (FIG. 2) as having a first post-transition target user group 404 representing employees or other interested and authorized parties. The first post-transition company 402 is illustrated as having a computing system 406 in communication with the system 200 via the network 258. For the post-transition company 402, a post-transition target data set 410 is to be generated and/or maintained, for example at and/or by the computing system 406 and/or at and/or by the computing system 206. Any number of post-transition companies are represented in FIG. 2 by implication and logical extension, each one of which having or receiving a respective target data set as represented for the first post-transition company 402 by the data set 410 and for the second post-transition company 502 by the data set 510.

In the illustrated example, each data object/set (310, 410, 510) includes or is to include a respective profile of each user of each user group (304, 404, 504). In FIG. 2 a representative profile is once illustrated as profile 312 for example with respect to a particular user 308 of the user group 304. It is understood that a respective profile for each other user of the initial user group 304 is similarly described by this reference and representation.

The representative profile 312 documents and/or stores records 314 representing applications and software, records 316 representing services and accounts, and records 318 representing other data and digital content. Records 314 representing applications and software can include code and/or executables, and can also or otherwise include credentials and links by which use of applications and software is enabled or authorized. The services and accounts represented by records 316 can relate similarly to code and/or executables, and can relate also or otherwise to credentials and links by which services, accounts, and communication can be provided by or conducted with the computing system 200 and/or other external systems 202 and 204 as illustrated in FIG. 1, and/or by the computing systems (406, 506).

Any and all of the records 314-318 and other elements of the profile 312 whether or not expressly illustrated can be or can include an application, a file, a database, and a link register. A link register is broadly intended to refer to links by which use of applications and software is enabled or authorized, contact lists, login credentials, and other data and content connected to or used by the user 308 or administrators 301 of the user group 304 or company 302 with respect to the user 308. The records 318 in particular, in at least one embodiment, document and/or store, for the particular user 308: user names; legal name including first, middle, and last; email addresses; mailing addresses; physical addresses; account numbers; social security number; birthdate; and online activities with reference at least to social media.

The system 200 is represented in abbreviated illustration in FIG. 2 for convenience to exemplify a system for sorting data sets. The system 200 accordingly, with respect to such embodiments descriptions of which herein in instances refer to elements of the drawings by reference numbers without limiting those descriptions to depicted elements, includes or constitutes a computing system 206 of a first entity including one or more processor 220 (FIG. 1) configured to execute computer-readable instructions 226, at least one of a memory device and a non-transitory storage device (222, 224 FIG. 1), and a communication interface for operatively connecting, via a communication network, the one or more processor to one or more agent device 212.

Upon execution of the computer-readable instructions, the computing system 200 performs steps including automatically sorting data content of the initial data object into multiple initial user profiles, each initial user profile of the multiple initial user profiles associated with a respective user of the initial user group. In a non-limiting example of a transition such as a demerger or partial acquisition, the initial or pre-existing or initial user group 304 represents employees of a company subject to transition. The users of the user group 304 have, access, or utilize respective profiles, accounts, applications, contact lists, and other legacy content in originating pre-transition data formats and these can be configured into any post-transition format according to preferences of a post-transition continuing company (402, 502) with which any given user is to continue post-transition as part of a target user group (404, 504).

Upon execution of the computer-readable instructions, the computing system 200 further performs a step of automatically generating multiple target data sets by adding, to each specific target data set of the multiple target data sets, a user-specific profile for each specific user of the target user group associated with the specific target data set, the user-specific profile including at least a portion of the initial user profile of the specific user. Generating the target data sets may include reconfiguring content of the initial data object into any post-transition data format according to preferences of a post-transition continuing company (402, 502). Data format is broadly intended to refer to any protocol or storage organization for data and digital content, with reference to databases, lists, table, folders, and other arrangements by which digital holdings of an entity are organized.

The company 402 is illustrated as having a post-transition or target user group 404 representing employees or other interested and authorized parties of the formed, reduced, split, or otherwise continuing company. The target user group 404 includes a subset of the user group 304. The computing system 406 represents in some embodiments new assets of the post-transition company, and continuing or separated assets from the pre-transition company. The first target data set 410 is to be generated and/or maintained and associated with the first target user group 404 and is to include a respective profile for each user of the first target user group 404.

In the illustrated example, the target data set 410 is generated to include a respective profile for each user of the target user group 404, representatively once illustrated as profile 412 for example with respect to a particular user 320 of the target user group 404. The representative profile 412 documents and/or stores records 414 representing applications and software, records 416 representing services and accounts, and records 418 representing other data and digital content. Records 414 representing applications and software can include code and/or executables, and can also or otherwise include credentials and links by which use of applications and software is enabled or authorized. The services and accounts represented by records 416 can relate similarly to code and/or executables, and can relate also or otherwise to credentials and links by which services and accounts provided by the computing system 200 and/or other external systems 202 and 204 as illustrated in FIG. 1. Any and all of the records 414-418 and other elements of the profile 412 not expressly illustrated can be or can include an application, a file, a database, and a link register. Each user-specific profile, for example as represented by the profile 412, can include at least a portion of the pre-transition user profile of the specific user from the initial data object 310.

Similarly, in the illustrated example, the target data set 510 is generated to include a respective profile for each user of the target user group 504, representatively once illustrated as profile 512 for example with respect to a particular user of the target user group 504. The representative profile 512 documents and/or stores records 514 representing applications and software, records 516 representing services and accounts, and records 518 representing other data and digital content. Records 514 representing applications and software can include code and/or executables, and can also or otherwise include credentials and links by which use of applications and software is enabled or authorized. The services and accounts represented by records 516 can relate similarly to code and/or executables, and can relate also or otherwise to credentials and links by which services and accounts provided by the computing system 200 and/or other external systems 202 and 204 as illustrated in FIG. 1. Any and all of the records 514-518 and other elements of the profile 512 not expressly illustrated can be or can include an application, a file, a database, and a link register.

In generating multiple target data sets by adding to each user-specific profiles for the users of the target user groups, user continuity is provided with reference to software and access to accounts and other content need by each user in their role in their respective target group. Each target data set is generated at least in part from content in the initial data object 310 by adding at least some data content for each user of the user group 304 who is continuing post-transition as a user of a post-transition target user group (404, 504). Each user-specific profile, for example as represented by the profile 512, can include at least a portion of the pre-transition user profile of the specific user from the initial data object 310 as represented by the profile 312.

In at least one example, each user of a particular target user group (404, 504) is an employee of a respective post-transition company (402, 502), and may be or may have been an employee of the pre-transition company 302. In such an example, the initial data object 310 is populated with content or service access for each unique user of the user group 304, and that content or service access at least in part is to be provided to that unique user in or by way of the respective company with which the unique user continues employment or engagement after the transition.

Generating a target data set can include or be conducted by, for each unique user of the target user group, creating or maintaining a user-specific profile, the user-specific profile associating the unique user with at least one of an application, a file, a database, and a link register. Maintaining here refers at least to examples in which the host or first entity system 200 has a pre-existing or pre-transition user-specific profile for a unique user, such as can occur when a pre-transition company undergoing a demerger or other dividing or splitting transition had previous engagement with the host or first entity system. In such a scenario, the existing pre-transition user-specific profile can be kept, with updates and/or data format conversions as may be preferred or specified by any transition plans or business rules, such that a corresponding post-transition profile is maintained as or transferred from the pre-existing profile with updates and/or revisions as needed.

In a scenario in which the initial user group 304 had no previous or pre-transition engagement with the host or first entity system 200, a single profile is created for each user of each target user group. In a scenario in which the first user group 504 had previous or pre-transition engagement with the host or first entity system 200, user-specific profiles may pre-exist the transition, such that at least some profiles may be essentially maintained or transferred, with updates and/or revisions as needed.

However generated, for example whether created or maintained, the user-specific profile for each unique user of each target user group can include content from any pre-existing profiles and/or other content and records pertaining to the user with reference to pre-transition information, content, settings, and access authorizations, documents, records, applications and software, services and accounts, and other data and digital content pertinent to the target user group (404, 504) and continuing post-transition company (402, 502). Each user-specific profile generated for each unique user of the target user group can include a user identification code unique to the unique user, for example within the records (418, 518) representing other data and digital content for the unique user, for identity recognition and data management and clerical purposes.

In conjunction with the above-described activities, the computing system 200 further automatically evaluates the data content of the initial data object 310 to indicate each user of the initial user group as either differentiated as a unique user or non-differentiated as a unique user. For example, ambiguity may be detected when sorting data content of the initial data object into multiple initial user profiles, where each initial user profile is user-unique. To conduct the evaluation, the data object 310 or its partial contents, for example the user profiles represented by the once illustrated profile 312, is evaluated. The profiles, represented for example by the records 318, store, for each particular user of the initial user group 304: one or more system or application user names; a legal name including first, middle, and last; an email address; a mailing address; a physical address; account numbers; a social security number; a birthdate; and records regarding online activities with reference at least to social media. By use of such records, the computing system 206 can automatically evaluate the data content of the initial data object 310 to indicate each user of the initial user group as either differentiated as a unique user or non-differentiated as a unique user.

To conduct the automatic evaluation, an automatic comparison of limited data can be conducted, such as, in at least one embodiment: usernames; first names; last names; and birthdates. The level of evaluation may vary among embodiments, in some examples according to time and cost feasibility, noting that exhaustive data mining of every datum of the initial data block 310 may be infeasible or inefficient. Thus, even in such an example in which differentiating data ultimately exists for each unique user of the initial user group, the automatic evaluation of the data content of the initial data object 310 may indicate some users as each non-differentiated as a unique user.

In one example, usernames and/or other data for two users are common, and thus by comparison of only such usernames and/or other data, or by other automated evaluation mode or modes, the two users are not indicated in such a preliminary or first-stage evaluation. Such an example is represented in FIG. 2, in that a user 320 is indicated as non-differentiated, in such a preliminary or first-stage evaluation, with respect to particular user 308.

The computing system 200 further performs a step of automatically transmitting an alert signal to the one or more agent device upon discriminating one or more user of the initial user group is indicated as non-differentiated as a unique user.

The notification signal 260 in FIG. 2 has been transmitted by the computing system to one or more agent devices, with reference to the agent device 212 and the virtual agent 214. The notification signal 260, when transmitted upon discriminating one or more user of the initial user group is indicated as non-differentiated as a unique user, alerts agents (210, 214) that review and further evaluation can be conducted.

For example, in some embodiments, the computing system further determines a unique identity for at least each user of the initial user group indicated as non-differentiated as a unique user. To conduct the determination, the computing system may, for example, transmit a confirmation request to a user device associated the non-differentiated user via at least one contact channel defined by the initial data object; compare at least two of first name, last name, and email address stored in the initial data object; and/or transmit a confirmation request to a user device associated with an authorized administrator 301 via at least one contact channel defined by the initial data object.

For example, an authorized administrator 301 of the initial user group and/or an authorized administrator (401, 501) of one or more of the target user groups (404, 504) can be contacted to confirm the user identity of any non-differentiated user, in which case the confirmation request may be sent externally with respect to the system 200, for example via the network 258. In another example, an agent 210 involved in handling the transition is sent a confirmation request, in which case the confirmation request may be sent internally with respect to the system 200.

When generating the multiple target data sets by adding, to each specific target data set of the multiple target data sets, a user-specific profile for each specific user of the target user group, the automated unique identification of each specific user assures that, for each one user of each target user group, a single user-specific profile is generated. For example as illustrated in FIG. 2, a unique identity for at least each user of the initial user group, with reference for example to the user 308 and user 320, a respective a user-specific profile (512, 412) is generated, each as part of the respective target data set (510, 410).

In some embodiments, the computing system further automatically transmits a notification signal 260 to one or more agent device 212 upon completion of generating at least one of the first target data set and second target data set.

The notification signal 260, when triggered by the completion of generating at least one of the first target data set 410 and second target data set 510, alerts agents (210, 214) that a completed target data set (410, 510) is ready for use by or provision to the corresponding target user group (404, 504). In some instances, post demerger validation is performed prior to provision of a target data set to the target user group. In the example of a company transition in which a target user group represents employees or other interested and authorized parties of a resulting organization, the target data set (410, 510) represents, optionally among other things, user accounts, user profiles, software applications, contact lists, and other services, functions, and access provided by or facilitated through the first entity and computing system 200.

The computing system 200, in some embodiments, further automatically reads a driver table 270 (FIG. 2) to determine whether each user of the initial user group 304 is in at least one target user group (404, 504) of the multiple target user groups. The computing system, in some embodiments, further confirms for each user of the initial user group being in a target user group, that at least one application of the user according to the initial data object (310) is established for the user according to the target data set (410, 510). This provides continuity to user of the post-transition target user groups (404, 504).

Accordingly, the above-described devices and systems are advantageous in demerging and managing user profiles, for example when demerging companies and potentially separating companies and users into post-transition groups to effectively manage the services acquired from or provided by a first entity. Methods and systems described herein facilitate separating a company, a division, and/or any initial user group into subsets to effectively manage, for example, ongoing banking services by one or more post-transition entity.

A company consisting of one working unit or many working units may need flexibility in how it transitions through a demerger or other restructuring after which multiple other companies, divisions or other work groups continue. A company may be re-organized. Transition may result in less continuing units, more continuing units, or restructured units. Continuity for some or all users can maintain workflow and efficiency by, for example, minimizing retraining. A subsidiary, work unit, or group of work units might need to have things set up differently in one or more work application.

It may be preferred to have things set up together. In one example, a company, work unit, or user may have five services, two services of which would be under one established profile and the other three services might be under another established profile. It may be preferred to keep those profiles separate. It may be preferred to combine the profiles so that the users only have to log in to one place and they don't have to log into multiple places to see all of the different underlying applications that they have or use.

Figure 4:
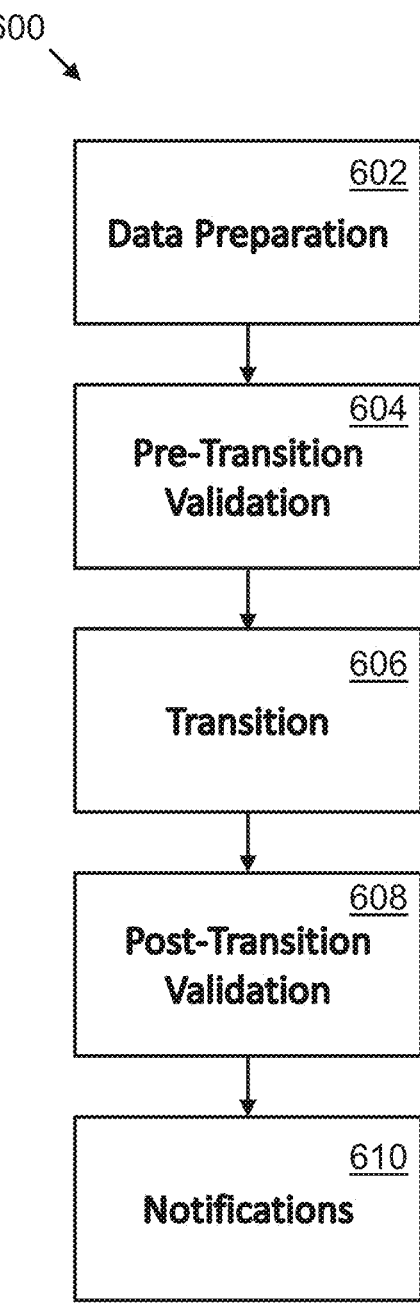
FIG. 4 is a flowchart representation of a method for transitioning a data set, according to at least one embodiment.

Automated processes implemented as systems and methods described herein are helpful during transitions including merger and acquisition (M&A) activities and demergers and divestitures. The processes are designed to address risks to organizations, including but not limited to operations, strategic, and reputational risks as a framework is established for an upcoming transition scenario. The process includes a set of components to streamline any commercial transition profile process. The components include data preparation, pre-transition validation, transition, post-transition validation, and notifications. These components are detailed in these descriptions each according to at least one embodiment, and are represented as method steps in a flow chart in FIG. 4, which represents a computer-implemented method 600 for sorting an initial data object associated with an initial user group by separation into multiple target data sets.

Data preparation is represented as a method step 602. This component involves reviewing the company and user level data to ensure that all of the requirements necessary for transition, such as a demerger in a non-limiting example, are met.

While some parts of any transition process may be manual, automation is implemented to streamline transitions and regularize results. In the example of a company demerging as represented for example in FIG. 2, a review of the information from the initial company 302 and information about the post-transition companies (402, 502) may be conducted, at least in part by automated process to confirm that users, work units, or other company components are accurately aligned, identified, and/or correlated.

Pre-Transition Validation is represented as a method step 604. This component ensures that like users are identified and only active users are considered for transition, such as demerging. The Pre-Transition Validation is conducted to confirm or decide which company or companies are going to be survive, and whether a company or any part thereof is going to be dissolving, so that underlying applications can be moved and/or maintained. This and other information is accumulated and put in a table, for example represented as driver table 270 in FIG. 2. The table enables a driver process for conducting a transition such as a demerger. Once the pre-transition and post-transition companies have been identified, data is then gathered and loaded into the driver table so that the transition process can begin. Validation is conducted in some embodiments of systems and methods described herein to confirm whether those profiles need to be demerged or not.

The transition is represented as a method step 606. This component is the core part of this process that transitions company and user level data within the target system. If needed, it could also be configured to separate company and user level information. This component is capable of addressing the following scenarios:

Same users and/or non-differentiated user—User identities are reviewed to confirm, for example, whether the users are the same or not, because there may be respective profiles and/or data fields in data objects with reference to both a Bob Smith and William Smith, which may or may not be the same person. If two users in an initial company involved in a transition are preliminarily non-differentiated based on first name, last name, birthdates and/or other data, all the accounts and applications held by the two users in the pre-transition company are identified and sorted by further determination to uniquely identify each user. The accounts and applications held by each user are appropriately provided to the respective surviving, continuing, or created company, for example as represented in FIGS. 2-3 and as detailed according to at least one embodiment in the corresponding descriptions.

Associated entities—If the dissolving or other pre-transition company has an associated entity, then that same associated entity will be added to a surviving company.

Applications and Accounts—If the dissolving or other pre-transition company has applications and accounts not available in a surviving company, then those applications and accounts will be added to a surviving company. This component triggers the appropriate notification informing the transitions team, for example with reference to agents (210, 214), of the overall status of the process which will enable them to follow up with the commercial customer after the transition process to ensure that everything worked as expected.

Separate Users—If the client needs separate or new users, then new user profiles are created and their applications and accounts are unassigned and reassigned as needed.

Post-Transition Validation is represented as a method step 608. This component ensures that all relevant data has been sorted, assigned, and disseminated according to the requirement specifications and business logic. This includes manual, automated and business validation. The automated validation includes a component to validate each user in the database (DB) and in the user interface (UI) where they would interact on a daily basis. The database validation may be quicker to validate in terms of establishing confidence that it conforms to the requirements. The UI validation may take more time based on the number of companies and users being merged and/or demerged. The automated process in some embodiments simulates the user's behavior as they navigate through the various tabs in the application to ensure that the data represents the expected results based on the business expectations. Validation is conducted to confirm that everything was combined appropriately. For any users common to more than one pre-existing group, for which combination is needed, validation verifies that they have the sum total of their accounts and applications that they had in a pre-transition company or pre-transitions unit. If a new user is added to a group, validation assures that each new user has all of the accounts and the applications that they need and/or had in a dissolving company. Already associated entities are accommodated. Any underlying applications actively used by any company in a demerger or transition, including those used by the dissolving company if they are to be used post-transition, need to be available to a surviving company to be assigned to the appropriate users. Some manual assistance may be provided to automated validation components that verify everything is provided correctly.

Notifications are represented as a method step 610. This component triggers the appropriate notification informing the transitions team, for example with reference to agents (210, 214), of the overall status of the process which will enable them to follow up with the commercial customer after the transition process to ensure that everything worked as expected.

The automatically transmitted notification signal 260 is triggered by the computing system upon discriminating one or more user of the initial user group is indicated as non-differentiated as a unique user, and alerts agents (210, 214) that review and further evaluation can be conducted. This addresses a data set structuring and computer configuring challenge of alerting an agent with time sensitive information as data sets are sorted and generated, enabling a timely completion of a data set transition without duplication of user data and consequent communication inefficiency and confusion that could otherwise occur if, for example: multiple profiles for a single user were created unaware to a target user group; and/or multiple profiles for separate users were incorrectly sorted and any subsequent erroneous profiles were generated.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A system for sorting an initial data object associated with an initial user group by separation into multiple target data sets, each target data set of the multiple target data sets being associated with a respective target user group of multiple target user groups, each target user group comprising a subset of users of the initial user group, the system comprising:

a computing system including at least one processor configured to execute computer-readable instructions, at least one of a memory device and a non-transitory storage device, and a communication interface for operatively connecting, via a communication network, the at least one processor to at least one agent device, wherein, upon execution of the computer-readable instructions, the at least one processor is configured to:

automatically sort data content of the initial data object into multiple initial user profiles, each initial user profile of the multiple initial user profiles associated with a respective user of the initial user group;

automatically evaluate the data content of the initial data object to indicate each user of the initial user group as either differentiated as a unique user or non-differentiated as a unique user by comparing records stored in the non-transitory storage device, the records comprising for each user of the initial user group a user name, a legal name, an email address, a mailing address, a physical address, an account numbers, a social security number, a birthdate; and a record regarding online activity;

automatically generate the multiple target data sets by adding, to each specific target data set of the multiple target data sets, a user-specific profile for each specific user of the target user group associated with the specific target data set, the user-specific profile including at least a portion of the initial user profile of the specific user, and by adding, to each user-specific profile for each specific user of each target user group at least one of an application, a file, digital information, and a link register;

automatically transmit an alert signal to the at least one agent device upon discriminating at least one user of the initial user group is indicated as non-differentiated as a unique user; and for each user of the initial user group indicated as non-differentiated as a unique user, determine a unique identity by at least one of:

transmitting a confirmation request to a user device associated with the non-differentiated user via at least one contact channel defined by the initial data object;

comparing at least two of first name, last name, and email address stored in the initial data object; and transmitting a confirmation request to a user device associated with an authorized administrator via at least one contact channel defined by the initial data object.

2. The system of claim 1, further comprising automatically transmitting a notification signal to the at least one agent device upon completion of generating the multiple target data sets.

3. The system of claim 1, wherein the at least one of an application, a file, digital information, and a link register is added to the user-specific profile according to an initial user profile in the initial data object corresponding to the specific user.

4. The system of claim 1, wherein the computing system further automatically reads a driver table to determine whether each user of the initial user group is in at least one target user group of the multiple target user groups.

5. The system of claim 1, wherein the computing system further confirms for each user of the initial user group being in a target user group, that at least one application of the user according to the initial data object is established for the user according to the target data set.

6. A system for sorting an initial data object associated with an initial user group by separation into at least a first target data set and a second target data set, the first target data set being associated with a first target user group comprising a first subset of users of the initial user group, the second target data set being associated with a second target user group comprising a second subset of users of the initial user group, the system comprising:

a computing system including one at least one processor configured to execute computer-readable instructions, at least one of a memory device and a non-transitory storage device, and a communication interface for operatively connecting, via a communication network, the at least one processor to at least one agent device, wherein, upon execution of the computer-readable instructions, the at least one processor is configured to:

automatically sort data content of the initial data object into multiple initial user profiles, each initial user profile of the multiple initial user profiles associated with a respective user of the initial user group;

automatically evaluate the data content of the initial data object to indicate each user of the initial user group as either differentiated as a unique user or non-differentiated as a unique user by comparing records stored in the non-transitory storage device, the records comprising for each user of the initial user group a user name, a legal name, an email address, a mailing address, a physical address, an account numbers, a social security number, a birthdate; and a record regarding online activity;

automatically generate the first target data set by adding a user-specific profile for each user of the first subset, the user-specific profile based at least in part on the initial user profile for the user, and by adding, to the user-specific profile for each user of the first target subset at least one of an application, a file, digital information, and a link register;

automatically generate the second target data set by adding a user-specific profile for each user of the second subset, the user-specific profile based at least in part on the initial user profile for the user, and by adding, to the user-specific profile for each user of the second target subset at least one of an application, a file, digital information, and a link register;

automatically transmit an alert signal to the at least one agent device upon discriminating at least one user of the initial user group is indicated as non-differentiated as a unique user; and for each user of the initial user group indicated as non-differentiated as a unique user, determine a unique identity by at least one of:

transmitting a confirmation request to a user device associated with the non-differentiated user via at least one contact channel defined by the initial data object;

comparing at least two of first name, last name, and email address stored in the initial data object; and transmitting a confirmation request to a user device associated with an authorized administrator via at least one contact channel defined by the initial data object.

7. The system of claim 6, further comprising automatically transmitting a notification signal to the at least one agent device upon completion of generating at least one of the first target data set and second target data set.

8. The system of claim 6, wherein the computing system further automatically reads a driver table to determine whether each user of the initial user group is in at least one of the first target user group and the second target user group.

9. The system of claim 6, wherein:

the computing system further confirms for each user of the initial user group being in the first target user group that at least one application of the user according to the initial data object is established for the user according to the first target data set; and the computing system further confirms for each user of the initial user group being in the second target user group that at least one application of the user according to the initial data object is established for the user according to the second target data set.

10. A method for a computing system to sort an initial data object associated with an initial user group by separation into multiple target data sets, each target data set of the multiple target data sets being associated with a respective target user group of multiple target user groups, each target user group comprising a subset of users of the initial user group, the computing system including one at least one processor configured to execute computer-readable instructions, at least one of a memory device and a non-transitory storage device, and a communication interface for operatively connecting, via a communication network, the at least one processor to at least one agent device, the method comprising, upon execution of the computer-readable instructions, the computing system performing steps comprising:

automatically sorting data content of the initial data object into multiple initial user profiles, each initial user profile of the multiple initial user profiles associated with a respective user of the initial user group;

automatically evaluating the data content of the initial data object to indicate each user of the initial user group as either differentiated as a unique user or non-differentiated as a unique user by use of records stored in the non-transitory storage device, the records comprising for each user of the initial user group a user name, a legal name, an email address, a mailing address, a physical address, an account numbers, a social security number, a birthdate; and a record regarding online activity;

automatically generating the multiple target data sets by adding, to each specific target data set of the multiple target data sets, a user-specific profile for each specific user of the target user group associated with the specific target data set, the user-specific profile including at least a portion of the initial user profile of the specific user, and by adding, to each user-specific profile for each specific user of each target user group at least one of an application, a file, digital information, and a link register; and automatically transmitting an alert signal to the at least one agent device upon discriminating at least one user of the initial user group is indicated as non-differentiated as a unique user; and for each user of the initial user group indicated as non-differentiated as a unique user, determining a unique identity by at least one of:

transmitting a confirmation request to a user device associated with the non-differentiated user via at least one contact channel defined by the initial data object;

comparing at least two of first name, last name, and email address stored in the initial data object; and transmitting a confirmation request to a user device associated with an authorized administrator via at least one contact channel defined by the initial data object.

11. The method of claim 10, further comprising automatically transmitting a notification signal to the at least one agent device upon completion of generating the multiple target data sets.

12. The method of claim 10, wherein the at least one of an application, a file, digital information, and a link register is added to the user-specific profile according to an initial user profile in the initial data object corresponding to the specific user.

13. The method of claim 10, wherein the computing system further automatically reads a driver table to determine whether each user of the initial user group is in at least one target user group of the multiple target user groups.

* * * * *